US007392347B2

(12) United States Patent
Briggs

(10) Patent No.: US 7,392,347 B2
(45) Date of Patent: Jun. 24, 2008

(54) SYSTEMS AND METHODS FOR BUFFERING DATA BETWEEN A COHERENCY CACHE CONTROLLER AND MEMORY

(75) Inventor: Theodore C. Briggs, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 234 days.

(21) Appl. No.: 10/435,140

(22) Filed: May 10, 2003

(65) Prior Publication Data
US 2004/0236901 A1 Nov. 25, 2004

(51) Int. Cl.
*G06F 13/00* (2006.01)
(52) U.S. Cl. .................. 711/129; 711/105; 714/768
(58) Field of Classification Search .......... 711/105, 711/129; 714/758, 768
See application file for complete search history.

(56) References Cited

U.S. PATENT DOCUMENTS

| 4,394,763 | A | | 7/1983 | Nagano et al. | |
|---|---|---|---|---|---|
| 5,533,189 | A | * | 7/1996 | Cheong et al. | 714/6 |
| 5,911,779 | A | * | 6/1999 | Stallmo et al. | 714/6 |
| 5,954,804 | A | | 9/1999 | Farmwald et al. | |
| 6,038,693 | A | * | 3/2000 | Zhang | 714/768 |
| 6,070,232 | A | * | 5/2000 | Ishida et al. | 711/143 |
| 6,353,910 | B1 | * | 3/2002 | Carnevale et al. | 714/763 |
| 6,502,218 | B1 | * | 12/2002 | George et al. | 714/805 |
| 2002/0016942 | A1 | | 2/2002 | MacLaren et al. | |
| 2002/0124143 | A1 | * | 9/2002 | Barroso et al. | 711/145 |
| 2002/0152444 | A1 | * | 10/2002 | Chen et al. | 714/785 |
| 2004/0225944 | A1 | * | 11/2004 | Brueggen | 714/758 |

FOREIGN PATENT DOCUMENTS

| DE | 43 92 143 | 11/1996 |
|---|---|---|
| DE | 696 20 650 | 11/2002 |
| GB | 1 168 173 A2 * | 1/2001 |

OTHER PUBLICATIONS

Affidavit of Richard W. Adkisson, Feb. 17, 2005, 4 pages.
Translation of the Office Action issued for German Patent Application No. 10 2004 003 352.8-53, dated May 3, 2005.
U.S. Appl. No. 10/435,150, C. M. Brueggen.
Kaneda, Shigeo, et al, "Single Byte Error Correcting-Double Byte Error Detecting Codes for Memory Systems." IEEE Transactions on Computers, vol. C-31, No. 7, Jul. 1982, pp. 596-602.
Morelos-Zaragoza, Robert H., "The Art of Error Correcting Coding." Sony Computer Science Laboratories, Inc. Japan. pp. 33-72, this book was published in 2002.

* cited by examiner

*Primary Examiner*—Pierre Bataille
*Assistant Examiner*—Sheng-Jen Tsai

(57) ABSTRACT

In one embodiment, the present invention is directed to a system processing memory transaction requests. The system includes a controller for storing and retrieving cache lines and a buffer communicatively coupled to the controller and at least one bus. The controller formats cache lines into a plurality of portions, implements an error correction code (ECC) scheme to correct a single-byte error in an ECC code word for pairs of the plurality of portions, stores respective pairs of plurality of portions such that each single-byte of the respective pairs of the plurality of portions is stored in a single one of a plurality of memory components. When the controller processes a memory transaction request that modifies tag data without modifying cache line data, the buffer calculates new ECC data utilizing previous ECC data, previous tag data, and the new tag data without requiring communication of cache line data.

20 Claims, 10 Drawing Sheets

FIG. 3

| 12 BITS | 4 BITS | 4 BITS | 4 BITS | 4 BITS | 4 BITS | 4 BITS | 4 BITS | 104 BITS | |
|---|---|---|---|---|---|---|---|---|---|
| ECC0 | | | | TAG[25:2] | | | TAG[1:0], 2 UNUSED | DATA0[103:0] | CHANNEL0 — 301 |
| | DATA1 [127:124] | | DATA0 [127:104] | | | | | DATA1[103:0] | CHANNEL1 — 302 |
| ECC1 | DATA2 [127:120] | | | DATA1 [123:104] | | | | DATA2[103:0] | CHANNEL2 — 303 |
| | DATA3 [127:116] | | | | DATA2 [119:104] | | | DATA3[103:0] | CHANNEL3 — 304 |
| ECC2 | DATA4 [127:112] | | | | | DATA3 [115:104] | | DATA4[103:0] | CHANNEL4 — 305 |
| | DATA5 [127:108] | | | | | | DATA4 [111:104] | DATA5[103:0] | CHANNEL5 — 306 |
| ECC3 | DATA6 [127:104] | | | | | | DATA5 [107:104] | DATA6[103:0] | CHANNEL6 — 307 |
| | DATA7 [127:104] | | | | | | UNUSED | DATA7[103:0] | CHANNEL7 — 308 |

300

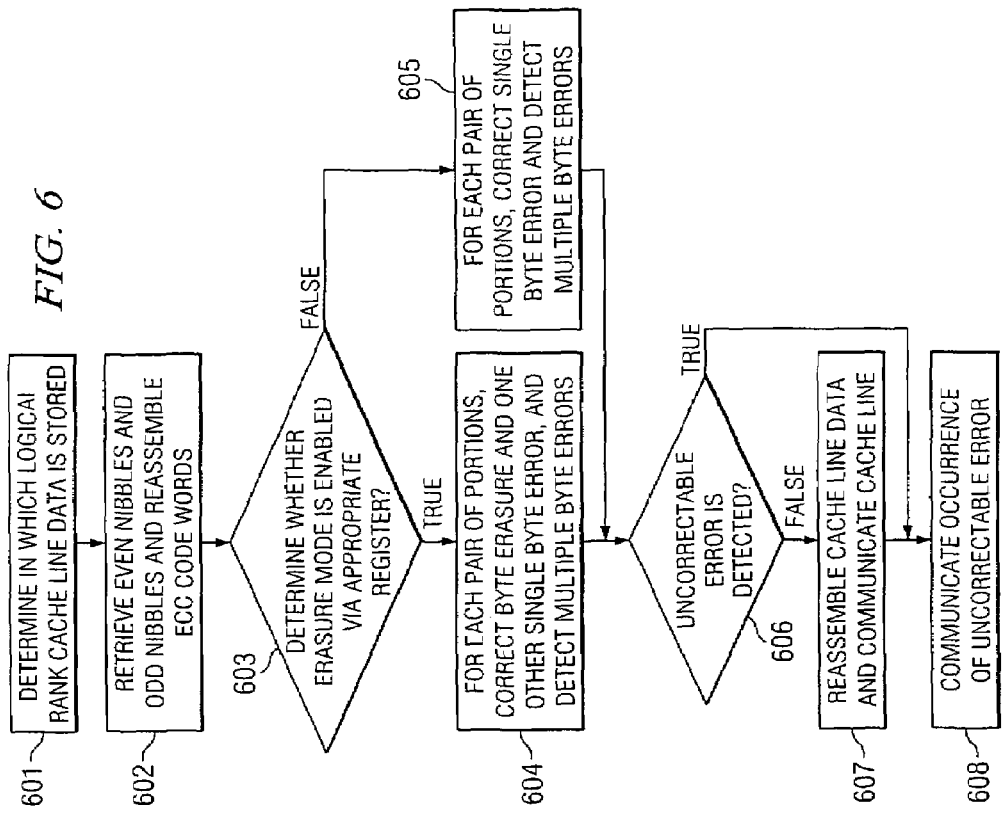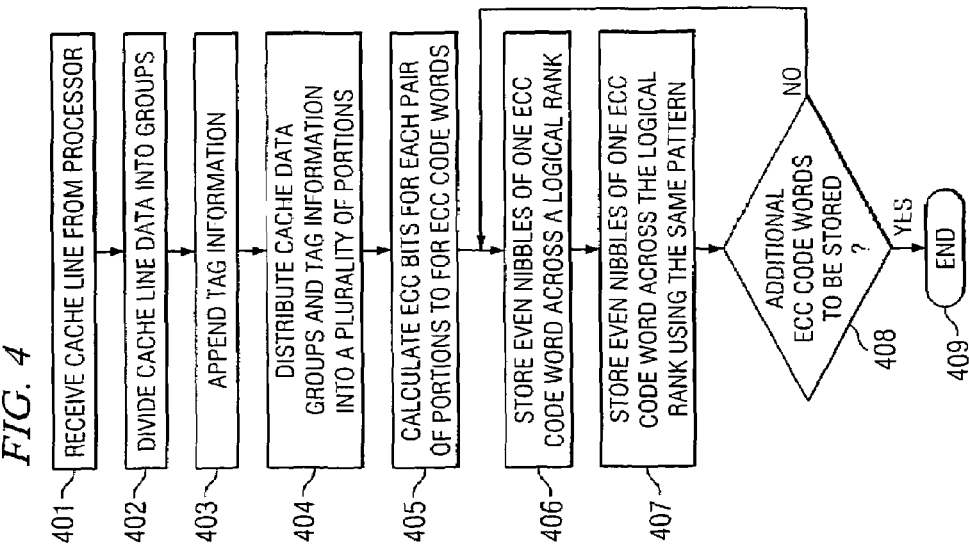

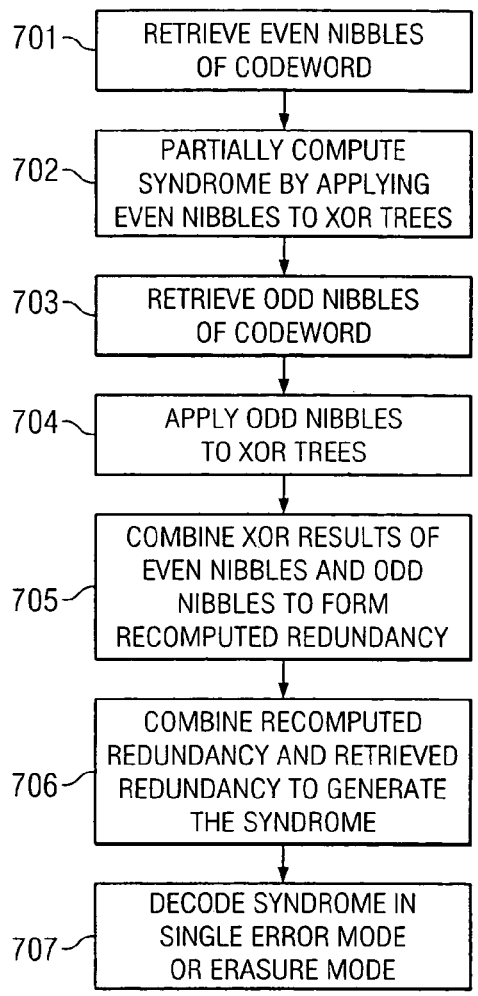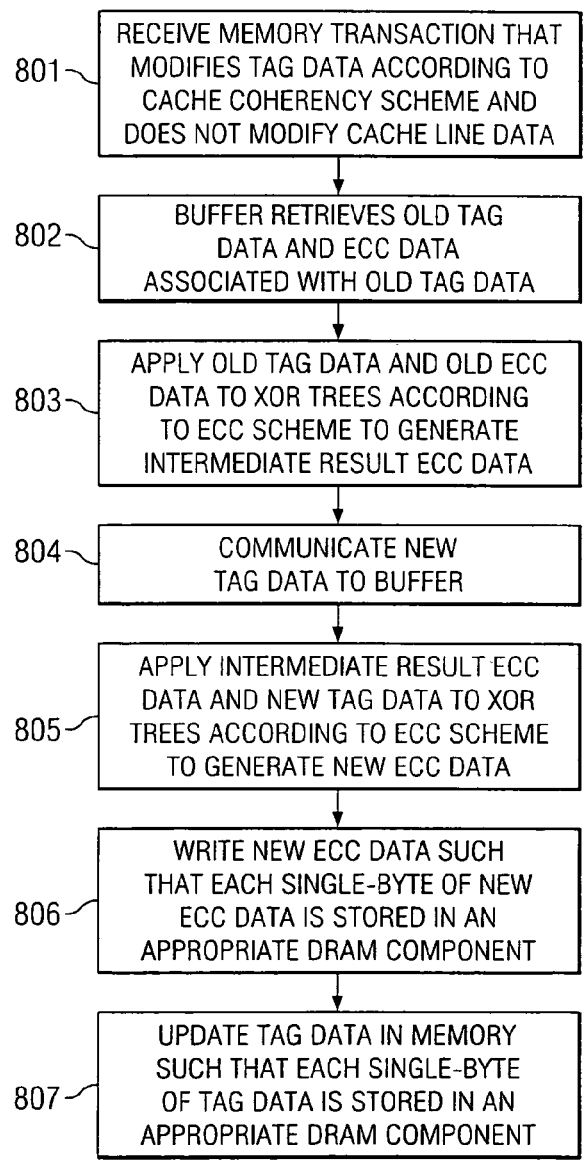

FIG. 9

900 old_data_ecc_XOR_c1[11]=old_ecc[11] ^
  old_data[23] ^ old_data[21] ^ old_data[19] ^
  old_data[17] ^ old_data[16] ^ old_data[12] ^
  old_data[10] ^ old_data[9] ^ old_data[6] ^
  old_data[3] ^ old_data[2] ^ old_data[1] ^
  old_data[0];
old_data_ecc_XOR_c1[10]=old_ecc[10] ^
  old_data[25] ^ old_data[24] ^ old_data[23] ^
  old_data[22] ^ old_data[21] ^ old_data[20] ^
  old_data[19] ^ old_data[16] ^ old_data[13] ^
  old_data[11] ^ old_data[10] ^ old_data[6] ^
  old_data[2];
old_data_ecc_XOR_c1[9]=old_ecc[9] ^
  old_data[25] ^ old_data[22] ^ old_data[21] ^
  old_data[20] ^ old_data[17] ^ old_data[12] ^
  old_data[8] ^ old_data[6] ^ old_data[0];
old_data_ecc_XOR_c1[8]=old_ecc[8] ^
  old_data[25] ^ old_data[24] ^ old_data[20] ^
  old_data[19] ^ old_data[16] ^ old_data[11] ^
  old_data[9] ^ old_data[7] ^ old_data[1];
old_data_ecc_XOR_c1[7]=old_ecc[7] ^
  old_data[25] ^ old_data[24] ^ old_data[22] ^
  old_data[17] ^ old_data[15] ^ old_data[11] ^
  old_data[10] ^ old_data[9] ^ old_data[4] ^
  old_data[3] ^ old_data[1] ^ old_data[0] ^
old_data_ecc_XOR_c1[6]=old_ecc[6] ^
  old_data[25] ^ old_data[24] ^ old_data[23] ^
  old_data[22] ^ old_data[21] ^ old_data[20] ^
  old_data[19] ^ old_data[17] ^ old_data[15] ^
  old_data[14] ^ old_data[12] ^ old_data[6] ^
  old_data[3] ^ old_data[2] ^ old_data[1];
old_data_ecc_XOR_c1[5]=old_ecc[5] ^
  old_data[24] ^ old_data[23] ^ old_data[21] ^
  old_data[18] ^ old_data[17] ^ old_data[15] ^
  old_data[14] ^ old_data[12] ^ old_data[11] ^
  old_data[10] ^ old_data[8] ^ old_data[6] ^
  old_data[2];

old_data_ecc_XOR_c1[4]=old_ecc[4] ^
  old_data[23] ^ old_data[22] ^ old_data[21] ^
  old_data[20] ^ old_data[17] ^ old_data[16] ^
  old_data[14] ^ old_data[13] ^ old_data[11] ^
  old_data[10] ^ old_data[9] ^ old_data[7] ^
  old_data[1];
old_data_ecc_XOR_c1[3]=old_ecc[3] ^
  old_data[25] ^ old_data[24] ^ old_data[23] ^
  old_data[22] ^ old_data[18] ^ old_data[17] ^
  old_data[13] ^ old_data[12] ^ old_data[10] ^
  old_data[5] ^ old_data[3] ^ old_data[2];
old_data_ecc_XOR_c1[2]=old_ecc[2] ^
  old_data[25] ^ old_data[23] ^ old_data[22] ^
  old_data[21] ^ old_data[19] ^ old_data[18] ^
  old_data[17] ^ old_data[16] ^ old_data[15] ^
  old_data[14] ^ old_data[11] ^ old_data[10] ^
  old_data[7] ^ old_data[5] ^ old_data[2] ^
  old_data[1];
old_data_ecc_XOR_c1[1]=old_ecc[1] ^
  old_data[22] ^ old_data[21] ^ old_data[20] ^
  old_data[19] ^ old_data[17] ^ old_data[16] ^
  old_data[12] ^ old_data[9] ^ old_data[7] ^
  old_data[6] ^ old_data[0];
old_data_ecc_XOR_c1[0]=old_ecc[0] ^
  old_data[25] ^ old_data[20] ^ old_data[19] ^
  old_data[18] ^ old_data[16] ^ old_data[15] ^
  old_data[13] ^ old_data[11] ^ old_data[8] ^
  old_data[6] ^ old_data[5];
  old_data[20] ^ old_data[18] ^ old_data[17] ^
  old_data[14] ^ old_data[13] ^ old_data[12] ^
  old_data[10] ^ old_data[9] ^ old_data[7] ^
  old_data[5] ^ old_data[4] ^ old_data[2];

FIG. 10

1000 old_data_XOR_c2[11] =
  old_data[24] ^ old_data[23] ^ old_data[21] ^
  old_data[19] ^ old_data[18] ^ old_data[15] ^
  old_data[13] ^ old_data[10] ^ old_data[9] ^
  old_data[8] ^ old_data[6] ^ old_data[5] ^
  old_data[1] ^ old_data[0];
old_data_XOR_c2[10] =
  old_data[23] ^ old_data[22] ^ old_data[21] ^
  old_data[20] ^ old_data[18] ^ old_data[14] ^
  old_data[12] ^ old_data[8] ^ old_data[7] ^
  old_data[5] ^ old_data[4] ^ old_data[0];
old_data_XOR_c2[9] =
  old_data[22] ^ old_data[20] ^ old_data[19] ^
  old_data[17] ^ old_data[11] ^ old_data[7] ^
  old_data[6] ^ old_data[5] ^ old_data[4] ^
  old_data[3];
old_data_XOR_c2[8] =
  old_data[25] ^ old_data[19] ^ old_data[18] ^
  old_data[17] ^ old_data[16] ^ old_data[13] ^
  old_data[10] ^ old_data[9] ^ old_data[6] ^
  old_data[4] ^ old_data[3] ^ old_data[2];
old_data_XOR_c2[7] =
  old_data[25] ^ old_data[22] ^ old_data[21] ^
  old_data[20] ^ old_data[19] ^ old_data[17] ^
  old_data[16] ^ old_data[15] ^ old_data[13] ^
  old_data[12] ^ old_data[10] ^ old_data[8] ^
  old_data[6] ^ old_data[5] ^ old_data[1] ^
  old_data[0];
old_data_XOR_c2[6] =
  old_data[24] ^ old_data[20] ^ old_data[19] ^
  old_data[18] ^ old_data[16] ^ old_data[15] ^
  old_data[14] ^ old_data[12] ^ old_data[11] ^
  old_data[9] ^ old_data[7] ^ old_data[4] ^
  old_data[1] ^ old_data[0];
old_data_XOR_c2[5] =
  old_data[23] ^ old_data[21] ^ old_data[19] ^
  old_data[18] ^ old_data[15] ^ old_data[14] ^
  old_data[13] ^ old_data[11] ^ old_data[10] ^
  old_data[8] ^ old_data[6] ^ old_data[5] ^
  old_data[3] ^ old_data[0];

old_data_XOR_c2[4] =
  old_data[25] ^ old_data[22] ^ old_data[21] ^
  old_data[20] ^ old_data[18] ^ old_data[17] ^
  old_data[14] ^ old_data[13] ^ old_data[12] ^
  old_data[10] ^ old_data[9] ^ old_data[7] ^
  old_data[5] ^ old_data[4] ^ old_data[2];
old_data_XOR_c2[3] =
  old_data[25] ^ old_data[24] ^ old_data[19] ^
  old_data[18] ^ old_data[17] ^ old_data[15] ^
  old_data[14] ^ old_data[13] ^ old_data[12] ^
  old_data[10] ^ old_data[9] ^ old_data[7] ^
  old_data[5] ^ old_data[4];
old_data_XOR_c2[2] =
  old_data[25] ^ old_data[24] ^ old_data[23] ^
  old_data[18] ^ old_data[17] ^ old_data[16] ^
  old_data[14] ^ old_data[12] ^ old_data[11] ^
  old_data[8] ^ old_data[6] ^ old_data[5] ^
  old_data[4] ^ old_data[3];
old_data_XOR_c2[1] =
  old_data[25] ^ old_data[24] ^ old_data[23] ^
  old_data[22] ^ old_data[21] ^ old_data[17] ^
  old_data[16] ^ old_data[15] ^ old_data[11] ^
  old_data[10] ^ old_data[9] ^ old_data[7] ^
  old_data[5] ^ old_data[4] ^ old_data[3] ^
  old_data[2];
old_data_XOR_c2[0] =
  old_data[24] ^ old_data[23] ^ old_data[22] ^
  old_data[20] ^ old_data[16] ^ old_data[15] ^
  old_data[14] ^ old_data[10] ^ old_data[8] ^
  old_data[6] ^ old_data[5] ^ old_data[4] ^
  old_data[3] ^ old_data[2];

FIG. 11

1100 new_ecc_c1[11]=old_data_ecc_XOR_c1[11] ^
  new_data[23] ^ new_data[21] ^ new_data[19] ^
  new_data[17] ^ new_data[16] ^ new_data[12] ^
  new_data[10] ^ new_data[9] ^ new_data[6] ^
  new_data[3] ^ new_data[2] ^ new_data[1] ^
  new_data[0];
new_ecc_c1[10]=old_data_ecc_XOR_c1[10] ^
  new_data[25] ^ new_data[24] ^ new_data[23] ^
  new_data[22] ^ new_data[21] ^ new_data[20] ^
  new_data[19] ^ new_data[16] ^ new_data[13] ^
  new_data[11] ^ new_data[10] ^ new_data[6] ^
  new_data[2];
new_ecc_c1[9]=old_data_ecc.XOR_c1[9] ^
  new_data[25] ^ new_data[22] ^ new_data[21] ^
  new_data[20] ^ new_data[17] ^ new_data[12] ^
  new_data[8] ^ new_data[6] ^ new_data[0];
new_ecc_c1[8]=old_data_ecc_XOR_c1[8] ^
  new_data[25] ^ new_data[24] ^ new_data[20] ^
  new_data[19] ^ new_data[16] ^ new_data[11] ^
  new_data[9] ^ new_data[7] ^ new_data[1];
new_ecc_c1[7]=old_data_ecc_XOR_c1[7] ^
  new_data[25] ^ new_data[24] ^ new_data[22] ^
  new_data[17] ^ new_data[15] ^ new_data[11] ^
  new_data[10] ^ new_data[9] ^ new_data[4] ^
  new_data[3] ^ new_data[1] ^ new_data[0];
new_ecc_c1[6]=old_data_ecc_XOR_c1[6] ^
  new_data[25] ^ new_data[24] ^ new_data[23] ^
  new_data[22] ^ new_data[21] ^ new_data[20] ^
  new_data[19] ^ new_data[17] ^ new_data[15] ^
  new_data[14] ^ new_data[12] ^ new_data[6] ^
  new_data[3] ^ new_data[2] ^ new_data[1];
new_ecc_c1[5]=old_data_ecc_XOR_c1[5] ^
  new_data[24] ^ new_data[23] ^ new_data[21] ^
  new_data[18] ^ new_data[17] ^ new_data[15] ^
  new_data[14] ^ new_data[12] ^ new_data[11] ^
  new_data[10] ^ new_data[8] ^ new_data[6] ^
  new_data[2];

new_ecc_c1[4]=old_data_ecc_XOR_c1[4] ^
  new_data[23] ^ new_data[22] ^ new_data[21] ^
  new_data[20] ^ new_data[17] ^ new_data[16] ^
  new_data[14] ^ new_data[13] ^ new_data[11] ^
  new_data[10] ^ new_data[9] ^ new_data[7] ^
  new_data[1];
new_ecc_c1[3]=old_data_ecc_XOR_c1[3] ^
  new_data[25] ^ new_data[24] ^ new_data[23] ^
  new_data[22] ^ new_data[18] ^ new_data[17] ^
  new_data[13] ^ new_data[12] ^ new_data[10] ^
  new_data[5] ^ new_data[3] ^ new_data[2];
new_ecc_c1[2]=old_data_ecc_XOR_c1[2] ^
  new_data[25] ^ new_data[23] ^ new_data[22] ^
  new_data[21] ^ new_data[19] ^ new_data[18] ^
  new_data[17] ^ new_data[16] ^ new_data[15] ^
  new_data[14] ^ new_data[11] ^ new_data[10] ^
  new_data[7] ^ new_data[5] ^ new_data[2] ^
  old_data[1];
new_ecc_c1[1]=old_data_ecc_XOR_c1[1] ^
  new_data[22] ^ new_data[21] ^ new_data[20] ^
  new_data[19] ^ new_data[17] ^ new_data[16] ^
  new_data[12] ^ new_data[9] ^ new_data[7] ^
  new_data[6] ^ new_data[0];
new_ecc_c1[0]=old_data_ecc_XOR_c1[0] ^
  new_data[25] ^ new_data[20] ^ new_data[19] ^
  new_data[18] ^ new_data[16] ^ new_data[15] ^
  new_data[13] ^ new_data[11] ^ new_data[8] ^
  new_data[6] ^ new_data[5];

FIG. 12

```
new_ecc_c2[11]=old_ecc_c2[11] ^ old_data XOR c2[11] ^
  new_data[24] ^ new_data[23] ^ new_data[21] ^
  new_data[19] ^ new_data[18] ^ new_data[15] ^
  new_data[13] ^ new_data[10] ^ new_data[9] ^
  new_data[8] ^ new_data[6] ^ new_data[5] ^
  new_data[1] ^ new_data[0];
new_ecc_c2[10]=old_ecc_c2[10] ^ old_data XOR c2[10] ^
  new_data[23] ^ new_data[22] ^ new_data[21] ^
  new_data[20] ^ new_data[18] ^ new_data[14] ^
  new_data[12] ^ new_data[8] ^ new_data[7] ^
  new_data[5] ^ new_data[4] ^ new_data[0];
new_ecc_c2[9]=old_ecc_c2[9] ^ old_data XOR c2[9] ^
  new_data[22] ^ new_data[20] ^ new_data[19] ^
  new_data[17] ^ new_data[11] ^ new_data[7] ^
  new_data[6] ^ new_data[5] ^ new_data[4] ^
  new_data[3];
new_ecc_c2[8]=old_ecc_c2[8] ^ old_data XOR c2[8] ^
  new_data[25] ^ new_data[19] ^ new_data[18] ^
  new_data[17] ^ new_data[16] ^ new_data[13] ^
  new_data[10] ^ new_data[9] ^ new_data[6] ^
  new_data[4] ^ new_data[3] ^ new_data[2];
new_ecc_c2[7]=old_ecc_c2[7] ^ old_data XOR c2[7] ^
  new_data[25] ^ new_data[22] ^ new_data[21] ^
  new_data[20] ^ new_data[19] ^ new_data[17] ^
  new_data[16] ^ new_data[15] ^ new_data[13] ^
  new_data[12] ^ new_data[10] ^ new_data[8] ^
  new_data[6] ^ new_data[5] ^ new_data[1] ^
  new_data[0];
new_ecc_c2[6]=old_ecc_c2[6] ^ old_data XOR c2[6] ^
  new_data[24] ^ new_data[20] ^ new_data[19] ^
  new_data[18] ^ new_data[16] ^ new_data[15] ^
  new_data[14] ^ new_data[12] ^ new_data[11] ^
  new_data[9] ^ new_data[7] ^ new_data[4] ^
  new_data[0];
new_ecc_c2[5]=old_ecc_c2[5] ^ old_data XOR c2[5] ^
  new_data[23] ^ new_data[21] ^ new_data[19] ^
  new_data[18] ^ new_data[14] ^ new_data[10] ^
  new_data[6] ^ new_data[5] ^ new_data[2];
new_ecc_c2[4]=old_ecc_c2[4] ^ old_data XOR c2[4] ^
  new_data[25] ^ new_data[22] ^ new_data[21] ^
  new_data[20] ^ new_data[18] ^ new_data[17] ^
  new_data[14] ^ new_data[13] ^ new_data[12] ^
  new_data[10] ^ new_data[9] ^ new_data[7] ^
  new_data[5] ^ new_data[4] ^ new_data[2];
new_ecc_c2[3]=old_ecc_c2[3] ^ old_data XOR c2[3] ^
  new_data[25] ^ new_data[24] ^ new_data[19] ^
  new_data[18] ^ new_data[17] ^ new_data[15] ^
  new_data[14] ^ new_data[13] ^ new_data[12] ^
  new_data[10] ^ new_data[9] ^ new_data[7] ^
  new_data[5] ^ new_data[4];
new_ecc_c2[2]=old_ecc_c2[2] ^ old_data XOR c2[2] ^
  new_data[25] ^ new_data[24] ^ new_data[23] ^
  new_data[18] ^ new_data[17] ^ new_data[16] ^
  new_data[14] ^ new_data[12] ^ new_data[11] ^
  new_data[8] ^ new_data[6] ^ new_data[5] ^
  new_data[4] ^ new_data[3];
new_ecc_c2[1]=old_ecc_c2[1] ^ old_data XOR c2[1] ^
  new_data[25] ^ new_data[24] ^ new_data[23] ^
  new_data[22] ^ new_data[21] ^ new_data[17] ^
  new_data[16] ^ new_data[15] ^ new_data[11] ^
  new_data[10] ^ new_data[9] ^ new_data[7] ^
  new_data[4] ^ new_data[3];
new_ecc_c2[0]=old_ecc_c2[0] ^ old_data XOR c2[0] ^
  new_data[24] ^ new_data[23] ^ new_data[22] ^
  new_data[20] ^ new_data[16] ^ new_data[15] ^
  new_data[14] ^ new_data[10] ^ new_data[8] ^
  new_data[6] ^ new_data[5] ^ new_data[4] ^
  new_data[3] ^ new_data[2];
```

1200

FIG. 13
1300 old_data_XOR[37] = old_data[37] ^
  old_data[25] ^ old_data[23] ^ old_data[21] ^
  old_data[13] ^ old_data[11] ^ old_data[9] ^
  old_data[1] ^ old_data[0];
old_data_XOR[36] = old_data[36] ^
  old_data[24] ^ old_data[22] ^ old_data[20] ^
  old_data[12] ^ old_data[10] ^ old_data[8] ^
  old_data[1];
old_data_XOR[35] = old_data[35] ^
  old_data[25] ^ old_data[23] ^ old_data[19] ^
  old_data[16] ^ old_data[15] ^ old_data[14] ^
  old_data[12] ^ old_data[11] ^ old_data[7] ^
  old_data[4] ^ old_data[3] ^ old_data[2];
old_data_XOR[34] = old_data[34] ^
  old_data[24] ^ old_data[22] ^ old_data[18] ^
  old_data[17] ^ old_data[16] ^ old_data[15] ^
  old_data[13] ^ old_data[12] ^ old_data[10] ^
  old_data[6] ^ old_data[5] ^ old_data[4] ^
  old_data[3];
old_data_XOR[33] = old_data[33] ^
  old_data[25] ^ old_data[21] ^ old_data[19] ^
  old_data[17] ^ old_data[16] ^ old_data[14] ^
  old_data[13] ^ old_data[12] ^ old_data[9] ^
  old_data[7] ^ old_data[5] ^ old_data[4] ^
  old_data[2];
old_data_XOR[32] = old_data[32] ^
  old_data[24] ^ old_data[20] ^ old_data[18] ^
  old_data[17] ^ old_data[15] ^ old_data[14] ^
  old_data[13] ^ old_data[8] ^ old_data[6] ^
  old_data[5] ^ old_data[3] ^ old_data[2];
old_data_XOR[31] = old_data[31] ^
  old_data[23] ^ old_data[21] ^ old_data[19] ^
  old_data[17] ^ old_data[15] ^ old_data[1];
old_data_XOR[30] = old_data[30] ^
  old_data[22] ^ old_data[20] ^ old_data[18] ^
  old_data[16] ^ old_data[14] ^ old_data[0];
old_data_XOR[29] = old_data[29] ^
  old_data[11] ^ old_data[9] ^ old_data[7] ^
  old_data[5] ^ old_data[3] ^ old_data[1] ^
  old_data[0];
old_data_XOR[28] = old_data[28] ^
  old_data[10] ^ old_data[8] ^ old_data[6] ^
  old_data[4] ^ old_data[2] ^ old_data[1];

FIG. 14
1400 new_ECC[37] = old_data_XOR[37] ^
  new_data[25] ^ new_data[23] ^ new_data[21] ^
  new_data[13] ^ new_data[11] ^ new_data[9] ^
  new_data[1] ^ new_data[0];
new_ECC[36] = old_data_XOR[36] ^
  new_data[24] ^ new_data[22] ^ new_data[20] ^
  new_data[12] ^ new_data[10] ^ new_data[8] ^
  new_data[1];
new_ECC[35] = old_data_XOR[35] ^
  new_data[25] ^ new_data[23] ^ new_data[19] ^
  new_data[16] ^ new_data[15] ^ new_data[14] ^
  new_data[12] ^ new_data[11] ^ new_data[7] ^
  new_data[4] ^ new_data[3] ^ new_data[2];
new_ECC[34] = old_data_XOR[34] ^
  new_data[24] ^ new_data[22] ^ new_data[18] ^
  new_data[17] ^ new_data[16] ^ new_data[15] ^
  new_data[13] ^ new_data[12] ^ new_data[10] ^
  new_data[6] ^ new_data[5] ^ new_data[4] ^
  new_data[3];
new_ECC[33] = old_data_XOR[33] ^
  new_data[25] ^ new_data[21] ^ new_data[19] ^
  new_data[17] ^ new_data[16] ^ new_data[14] ^
  new_data[13] ^ new_data[12] ^ new_data[9] ^
  new_data[7] ^ new_data[5] ^ new_data[4] ^
  new_data[2];
new_ECC[32] = old_data_XOR[32] ^
  new_data[24] ^ new_data[20] ^ new_data[18] ^
  new_data[17] ^ new_data[15] ^ new_data[14] ^
  new_data[13] ^ new_data[8] ^ new_data[6] ^
  new_data[5] ^ new_data[3] ^ new_data[2];
new_ECC[31] = old_data_XOR[31] ^
  new_data[23] ^ new_data[21] ^ new_data[19] ^
  new_data[17] ^ new_data[15] ^ new_data[1];
new_ECC[30] = old_data_XOR[30] ^
  new_data[22] ^ new_data[20] ^ new_data[18] ^
  new_data[16] ^ new_data[14] ^ new_data[0];
new_ECC[29] = old_data_XOR[29] ^
  new_data[11] ^ new_data[9] ^ new_data[7] ^
  new_data[5] ^ new_data[3] ^ new_data[1] ^
  new_data[0];
new_ECC[28] = old_data_XOR[28] ^
  new_data[10] ^ new_data[8] ^ new_data[6] ^
  new_data[4] ^ new_data[2] ^ new_data[1];

SYSTEMS AND METHODS FOR BUFFERING DATA BETWEEN A COHERENCY CACHE CONTROLLER AND MEMORY

RELATED APPLICATIONS

The present application is related to commonly assigned and co-pending U.S. patent application Ser. No. 10/435,150, filed May 9, 2003, entitled "SYSTEMS AND METHODS FOR PROCESSING AN ERROR CORRECTION CODE WORD FOR STORAGE IN MEMORY COMPONENTS," which is incorporated herein by reference.

FIELD OF THE INVENTION

The present invention is related to transferring data from distributed memory to a processor utilizing a coherency controller.

DESCRIPTION OF RELATED ART

In a distributed shared memory architecture, a plurality of processors may read from and write to a plurality of shared memory resources. Portions of the shared memory resources may be subject to various states. For example, one of the plurality of processors may lock a particular page of memory for a period of time or a group of the plurality of processors may share access to a particular page. Also, the plurality of processors generally communicate with the plurality of shared memory resources through a physical interconnect. The plurality of processors typically utilize caching mechanisms to optimize the performance of memory accesses thereby avoiding the necessity of utilizing the physical interconnect for each memory transaction. The use of caching mechanisms in a distributed shared memory scheme involves providing a tracking scheme or protocol to ensure coherency between processors that access the same physical memory locations.

In general, there are two groups of protocols that address cache coherency in a distributed shared memory architecture. Specifically, broadcast protocols may be employed where a write transaction is broadcast to all processors in the system. Typically, the broadcast occurs through the communication of write transactions on a shared bus. Broadcast protocols are generally referred to as "snoopy" protocols, because all of the processors monitor the bus for write transactions and take appropriate action if a write transaction is detected which affects a line contained in their respective cache.

Alternatively, directory-based cache coherency protocols may be employed. In directory-based cache coherency protocols, a write transaction is forwarded to only those processors that are known to possesses a copy of the newly altered cache line. In these protocols, state information is maintained in a centralized or distributed directory to track the state of cache lines. A requesting cache may query the directory to determine the owners of any caches that are sharing the same cache lines. Only caches identified in the directory are sent invalidate signals or write updates. Directory-based cache coherency protocols are advantageous, because there is no need to connect all processors on a single bus. Moreover, the amount of traffic over the interconnect is reduced as compared to snoopy protocols. Thus, directory-based cache coherency protocols are better suited to scalable architectures.

Further, commonly available memories (such as dynamic random access memory (DRAM)) used in distributed memory architectures can be problematic. Specifically, there is a probability that, when data is stored in memory and subsequently retrieved, the retrieved data will suffer some corruption. For example, DRAM stores information in relatively small capacitors that may suffer a transient corruption due to a variety of mechanisms. Additionally, data corruption may occur as the result of hardware failures such as loose memory modules, blown chips, wiring defects, and/or the like. The errors caused by such failures are referred to as repeatable errors, since the same physical mechanism repeatedly causes the same pattern of data corruption.

To address this problem, a variety of error detection and error correction algorithms have been developed. In general, error detection algorithms typically employ redundant data added to a string of data. The redundant data is calculated utilizing a check-sum or cyclic redundancy check (CRC) operation. When the string of data and the original redundant data is retrieved, the redundant data is recalculated utilizing the retrieved data. If the recalculated redundant data does not match the original redundant data, data corruption in the retrieved data is detected.

Error correction code (ECC) algorithms operate in a manner similar to error detection algorithms. When data is stored, redundant data is calculated and stored in association with the data. When the data and the redundant data are subsequently retrieved, the redundant data is recalculated and compared to the retrieved redundant data. When an error is detected (e.g., the original and recalculated redundant data do not match), the original and recalculated redundant data may be used to correct certain categories of errors. An example of a known ECC scheme is described in "Single Byte Error Correcting-Double Byte Error Detecting Codes for Memory Systems" by Shigeo Kaneda and Eiji Fujiwara, published in IEEE TRANSACTIONS on COMPUTERS, Vol. C31, No. 7, July 1982.

In general, ECC algorithms may be embedded in a number of components in a computer system to correct data corruption. Frequently, ECC algorithms may be embedded in memory controllers such as coherent memory controllers in distributed shared memory architectures. The implementation of the ECC algorithm generally imposes limitations upon the implementation of a memory controller such as bus width and frequency. Accordingly, the implementation of the ECC algorithm may impose operational limitations on memory transactions.

Known systems have implemented cache coherency schemes and ECC algorithms within a memory controller system. Also, in known systems that utilize single-bit error correction, it is possible to update directory tag data (the data defining the state of a cache line according to the cache coherency scheme) without requiring communication of the cache line data. Specifically, the ECC data associated with the cache line can be updated without requiring the communication and processing of the cache line data. However, known systems that update tag data in this manner exhibit poor bus utilization due to limitations associated with the single bit ECC algorithm. In particular, known systems require operation over four single bit ECC domains and, therefore, required a very wide bus (e.g., 576 bits) thereby causing bus utilization to be poor.

BRIEF SUMMARY OF THE INVENTION

In one embodiment, the present invention is directed to a system processing memory transaction requests. The system includes a controller for storing and retrieving cache lines and a buffer communicatively coupled to the controller and at least one bus. The controller formats cache lines into a plurality of portions, implements an error correction code (ECC) scheme to correct a single-byte error in an ECC code word for pairs of the plurality of portions, stores respective pairs of plurality of portions such that each single-byte of the respective pairs of the plurality of portions is stored in a single one of a plurality of memory components. When the controller processes a memory transaction request that modifies tag data without modifying cache line data, the buffer calculates new ECC data utilizing previous ECC data, previous tag data, and the new tag data without requiring communication of cache line data.

BRIEF DESCRIPTION OF THE DRAWINGS

FIG. 3 depicts a cache line layout that may be utilized to store cache data in memory by a memory controller implemented according to representative embodiments.

FIG. 4 depicts a flowchart for processing of cache data adapted to an ECC algorithm according to representative embodiments.

FIGS. 6 and 7 depict flowcharts for processing of cache data adapted to an ECC algorithm according to representative embodiments.

FIG. 8 depicts a flowchart associated with modification to tag data according to representative embodiments.

FIGS. 9-12 depict XOR-trees for calculating new ECC data associated with a tag update transaction according to representative embodiments.

FIGS. 13-14 depict other XOR-trees for calculating new ECC data associated with a tag update transaction according to representative embodiments.

DETAILED DESCRIPTION

Figure 1:
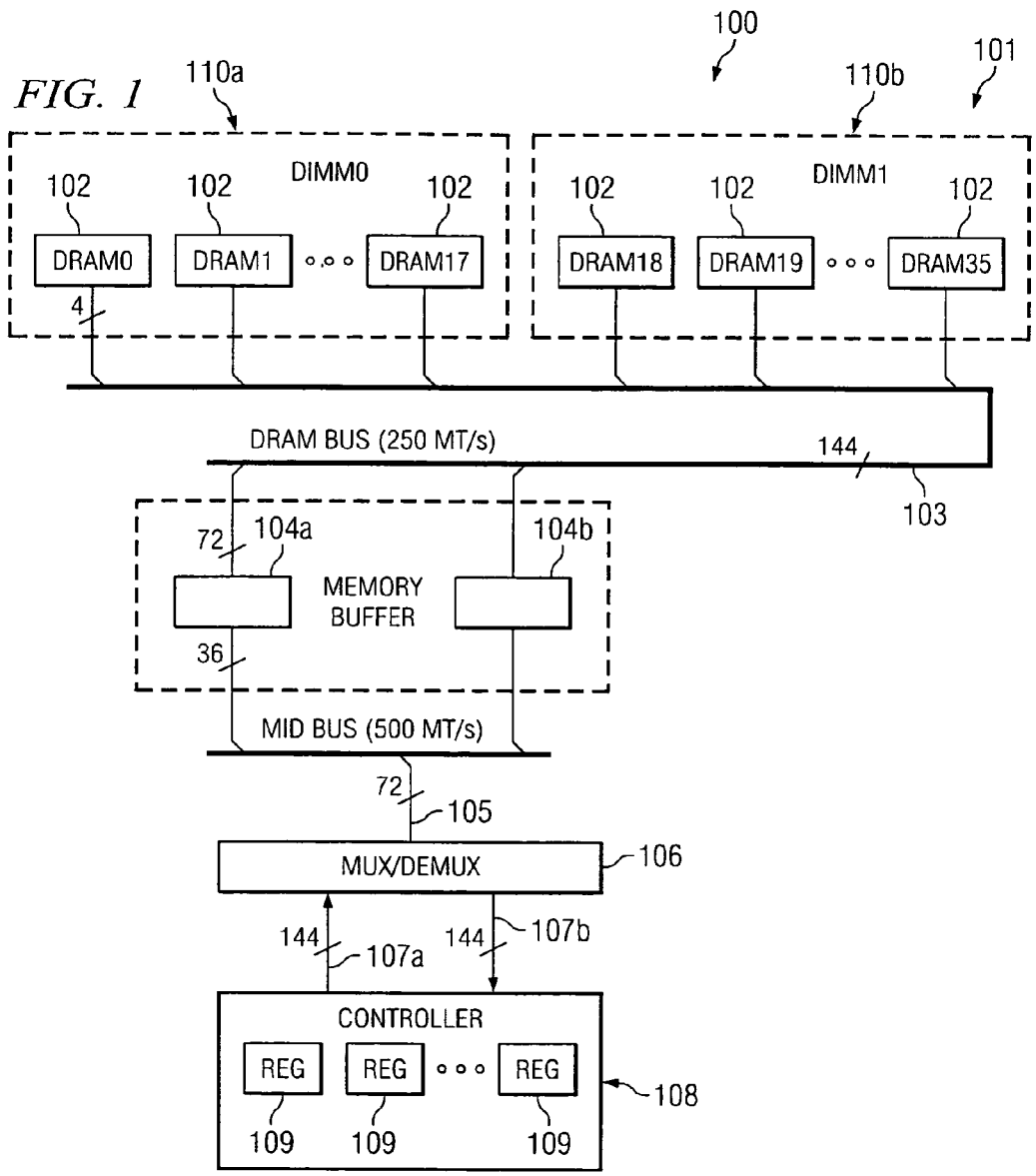
FIG. 1 depicts a memory controller system according to representative embodiments.

Representative embodiments advantageously implement a byte error correction ECC algorithm within a memory system to provide increased reliability of the memory system. Specifically, representative embodiments may store cache lines in memory by distributing the various bits of the cache line across a plurality of DRAM components. When the byte ECC algorithm is combined with an appropriate distribution of data across the plurality of DRAM components, representative embodiments may tolerate the failure of an entire DRAM component without causing the failure of the entire memory system. Representative embodiments may also utilize a dual-cycle implementation of an ECC scheme to adapt the ECC scheme to optimize the utilization of an associated bus. Representative embodiments may selectively enable an "erasure" mode for the ECC algorithm when a repeatable error is identified to increase the probability of correcting additional errors. The erasure mode may be applied to a limited portion of the memory system to decrease the probability of incorrectly diagnosed data corruption.

Representative embodiments further optimize processing of cache lines stored in a plurality of DRAM components within a distributed memory architecture that utilizes cache coherency. Specifically, selected memory transactions within the cache coherency scheme may affect a directory tag associated with a cache line without affecting the data associated with the cache line. For these types of memory transactions, the cache controller that implements the cache coherency protocol need not communicate and process all of the cache line data to affect a change in the tag data. Instead, an "intelligent buffer" is utilized to modify the tag data and modify the ECC data according to the modified tag data. By doing so, bus utilization and memory component utilization may be optimized.

Representative embodiments may utilize a suitable Reed-Solomon burst error correction code to perform byte correction. In Reed-Solomon algorithms, the code word consists of n m-bit numbers: $C=(c, c_{n-2}, \ldots, c_o)$. The code word may be represented mathematically by the following polynomial of degree n with the coefficients (symbols) being elements in the finite Galios field $(2^m)$: $C(x)=(cx^{n-1}+c_{n-2}x^{n-2} \ldots +c_o)$. The code word is generated utilizing a generator polynomial (typically denoted by $g(x)$). Specifically, the payload data (denoted by $u(x)$) is multiplied by the generator polynomial, i.e., $C(x)=x^{n-k}u(x)+[x^{n-k}u(x)mod(g(x))]$ for systematic coding. Systematic coding causes the original payload bits to appear explicitly in defined positions of the code word. The original payload bits are represented by $x^{n-k}u(x)$ and the redundancy information is represented by $[x^{n-k}u(x)mod(g(x))]$.

When the code word is subsequently retrieved from memory, the retrieved code word may suffer data corruption due to a transient failure and/or a repeatable failure. The retrieved code word is represented by the polynomial $r(x)$. If $r(x)$ includes data corruption, $r(x)$ differs from $C(x)$ by an error signal $e(x)$. The redundancy information is recalculated from the retrieved code word. The original redundancy information as stored in memory and the newly calculated redundancy information are combined utilizing an exclusive-or (XOR) operation to form the syndrome polynomial $s(x)$. The syndrome polynomial is also related to the error signal. Using this relationship, several algorithms may determine the error signal and thus correct the errors in the corrupted data represented by $r(x)$. These techniques include error-locator polynomial determination, root finding for determining the positions of error(s), and error value determination for determining the correct bit-pattern of the error(s). For additional details related to recovery of the error signal $e(x)$ from the syndrome $s(x)$ according to Reed-Solomon burst error correction codes, the reader is referred to THE ART OF ERROR CORRECTING CODES by Robert H. Morelos-Zaragoza, pages 33-72 (2002), which is incorporated herein by reference.

Erasures in error correction codes are specific bits or specific strings of bits that are known to be corrupted without resorting to the ECC functionality. For example, specific bits may be identified as being corrupted due to a hardware failure such as a malfunctioning DRAM component, a wire defect, and/or the like. Introduction of erasures into the ECC algorithm is advantageous, because the positions of the erased bits are known. Let d represent the minimum distance of a code, v represent the number of errors, and µ represent the number of erasures contained in a received ECC code word. Then, the minimum Hamming distance between code words is reduced to at least d−µ in the non-erased portions. It follows that the error-correcting capability is [(d−µ−1)/2] and the following relation is maintained: d>2v+µ. Specifically, this inequality demonstrates that for a fixed minimum distance, it is twice as "easy" to correct an erasure as it is to correct a randomly positioned error.

In representative embodiments, the ECC algorithm of a memory controller may implement the decoding procedure of a [36, 33, 4] shortened narrow-sense Reed-Solomon code (where the code word length is 36 symbols, the payload length is 33 symbols, and the Hamming distance is 4 bits) over the finite Galios field ($2^8$). The finite Galios field defines the symbol length to be 8 bits. By adapting the ECC algorithm in this manner, the ECC algorithm may operate in two distinct modes. In a first mode, the ECC algorithm may perform single-byte correction in which the term "single-byte" refers to 8 contiguous bits aligned to 8-bit boundaries. A single-byte error refers to any number of bits within a single-byte that are corrupted. Errors that cause bit corruption in more than one byte location are referred to as "multiple-byte errors" which are detected as being uncorrectable. In the second mode (the erasure mode), a byte location (or locations) is specified in the ECC code word as an erasure via a register setting. The location may be identified by a software or firmware process as a repeatable error caused by a hardware failure. Because the location of the error is known, in the erasure mode, the ECC algorithm can correct the byte error associated with the erasure and one other randomly located single-byte error (or two erasure single-byte errors if desired).

Referring now to the drawings, FIG. 1 depicts system 100 adapted to implement a suitable ECC code such as the [36, 33, 4] shortened narrow-sense Reed-Solomon code according to representative embodiments. System 100 comprises a plurality of dual in-line memory modules (DIMMs) shown as 110a and 110b. Additional DIMMs 110 (not shown) may be utilized if desired as will be discussed in greater detail below. Each of DIMMs 110a and 110b include a plurality of 4-bit wide DRAM components 102 (shown as DRAM0-DRAM 17 and DRAM18-DRAM35, respectively). Thus, DIMMs 110a and 110b form logical rank 101 that has a width of 144 bits. DIMMs 110a and 110b are communicatively coupled to a plurality of buffer chips 104a and 104b by bus 103 (or multiple buses). Buffer chips 104a and 104b operate in parallel to buffer cache lines and to translate between respective buses. Specifically, bus 103 may possess a width of 144 bits at 250 MT/s and bus 105 may possess a width of 72 bits and operate at 500 MT/s. Also, one of or both of buffer chips 104a and 104b may modify directory tag data and associated ECC data without requiring communication of cache line data as will be discussed in greater detail below. Bus 105 may be demultiplexed by multiplexer/demultiplexer (MUX/DEMUX) 106. Controller 108 may communicate with demultiplexer 106 via two unidirectional 144-bit buses (one for incoming data and the other for outgoing data).

Controller 108 may process cache lines associated with data stored in DIMMs 110a and 10b according to representative embodiments. By suitably distributing data over the various DRAM components 102 and by utilizing a suitably adapted byte correction ECC algorithm, system 100 enables an entire DRAM component 102 to fail without causing the failure of memory system 100. The error correcting functionality of controller 108 may implement an ECC utilizing standard logic designs. Specifically, the ECC functionality of controller 108 may be implemented utilizing XOR trees, shift-registers, look-up tables, and/or other logical elements. Moreover, controller 108 may selectively enable erasure mode processing for data stored in DIMM 110a utilizing registers 109.

Figure 2:
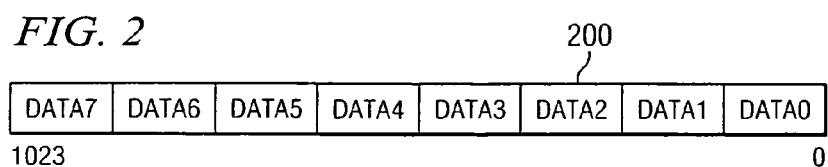
FIG. 2 depicts cache line format that may be utilized by a memory controller implemented according to representative embodiments.

FIGS. 2 and 3 depict a cache line format and a cache line layout for implementation by controller 108 to facilitate the storage of cache data across a plurality of DRAM components 102 according to representative embodiments. Specifically, cache line format 200 in FIG. 2 depicts the cache line format for communication of cache data to and from processors (not shown in the drawings) in, for example, a distributed shared memory architecture. The respective bits (indexed from 0 to 1023) of the cache line are apportioned into a plurality of groups (denoted by DATA0-DATA7). Each of the groups contains 128 bits.

Cache line layout 300 in FIG. 3 illustrates how the respective bits of cache lines received from processors are stored in DRAM components 102 by controller 108 with ECC information and directory tag information. The ECC bits (the redundancy information) may be calculated utilizing the Reed-Solomon code algorithm. The directory tag information may be created and updated in accordance with a memory coherency scheme to enable system 100 to operate within a distributed shared memory architecture. Cache line layout 300 divides the cache line data, tag data, and ECC bits into eight portions (shown as 301-308) with each portion having 144 bits of data. Each portion includes 12 ECC bits. The ECC bits are used to correct errors in two respective portions. For example, the 12 ECC bits of portion 301 and the 12 ECC bits of portion 302 are used to correct byte errors in the ECC code word formed by both of portions 301 and 302. Furthermore, the 26 bits of tag data are stored in portion 301. The cache line data groups (DATA7-DATA0) are staggered though portions 301-309. As previously noted, DIMMs 110a and 110b form logical rank 101 that has a width of 144 bits. Cache line layout 300 is adapted according to the physical layout of DIMMs 110a and 110b. When cache line layout 300 is adapted in this manner, each of portions 301-308 may be stored across logical rank 101.

By distributing each of portions 301-308 over DRAM components 102 and by utilizing the discussed Reed-Solomon code, an entire DRAM component 102 may fail without causing the failure of memory system 100. Specifically, each respective two portions (e.g., portions 301 and 302) that share the 24 ECC bits may be stored across logical rank 101. The even nibbles (i.e., the first four bits of a single-byte) of the ECC code word may be stored across respective 36 DRAM components 102 of logical rank 101 during a first bus cycle. Then, the odd nibbles of the ECC code word may be stored across the 36 DRAM components 102 utilizing the same pattern as the even nibbles during a second bus cycle. Thereby, each single-byte (8 contiguous bits aligned to 8-bit boundaries) is stored with a single DRAM component 102. When one of the DRAM components 102 fails, the resulting data corruption of the particular ECC code word is confined to a single-byte. Thus, the ECC algorithm may correct the data corruption associated with the hardware failure and may also correct another error in another byte. Accordingly, the architecture of system 100 and the implementation of controller 108 may optimize the error correcting functionality of the ECC algorithm.

FIG. 4 depicts a flowchart for processing cache lines by controller 108 according to representative embodiments. In step 401, a cache line is received from a processor. In step 402, the cache line data is divided into groups. In step 403, tag information is appended to one of the groups. In step 404, the cache data groups and the tag information is distributed into a plurality of portions. In step 405, ECC bits are calculated for each pair of the portions to form ECC code words that consist of the ECC bits and the respective cache data and/or the tag information. In step 406, the even nibbles of one ECC code word are stored across a logical rank. In step 407, the odd nibbles of the ECC code word are stored across the logical rank using the same pattern. In step 408, a logical comparison is made to determine whether additional ECC code words remain to be stored. If additional ECC code words remain to be stored, the process flow returns to step 406. If not, the process flow proceeds to step 409 to end the process flow.

Figure 5:
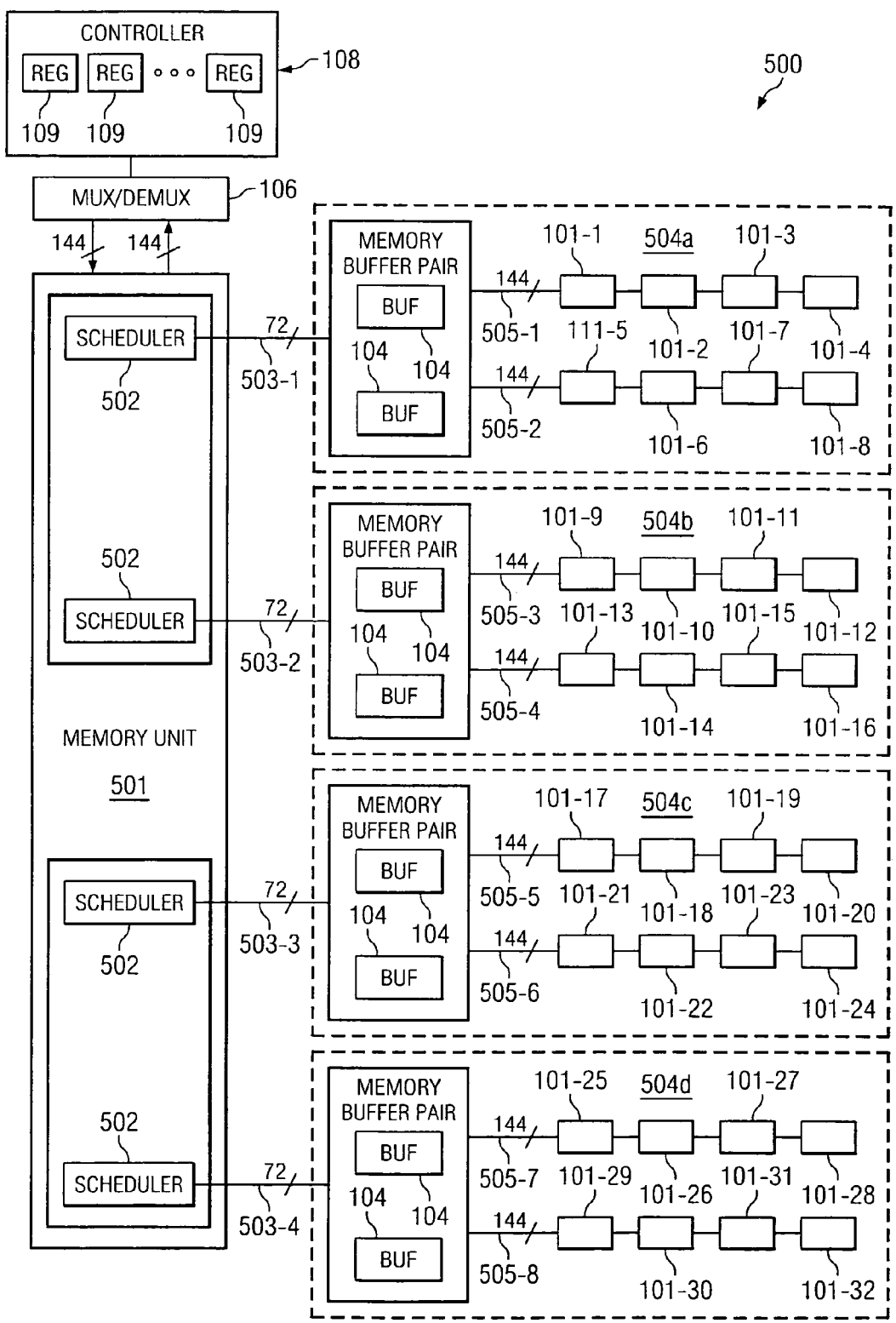
FIG. 5 depicts a memory system in which an ECC algorithm may selectively apply erasure mode error correction to data retrieved from limited portions of the memory system.

In representative embodiments, controller 108 may apply the erasure mode correction to various portions of a memory system such as memory system 500 of FIG. 5. Memory system 500 includes a plurality of memory quadrants 504a-504d for storage and retrieval of data through memory unit 501 by controller 108. Memory unit 501 includes a plurality of schedulers 502 to schedule access across quadrant buses 503. Quadrant buses 503-1 through 503-4 may be implemented utilizing a bus width of 72 bits. By utilizing a bus width of 72 bits and by suitably communicating an ECC code word in respective cycles, each single-byte of an ECC code word is transmitted across a respective pair of wires of a respective quadrant bus 503. If wire failures associated with one of quadrant buses 503 are confined to two or less single-bytes of an ECC code word, controller 108 may compensate for the wire failure(s) by utilizing the erasure mode and identification of the respective error pattern.

Furthermore, each of quadrants 504 include a pair of memory buffers 104. Each memory buffer 104 is coupled to a respective DRAM bus (shown as 505-1 through 505-8). Also, four logical memory ranks (shown as 101-1 through 101-32) are coupled to each DRAM bus 505. Each DRAM bus 505 has a bus width of 144 bits. By utilizing a bus width of 144 bits and by communicating data in respective bus cycles, each single-byte of an ECC code word is transferred across a respective set of four wires of DRAM bus 505. Thus, if any set of wire failures affects two or less single-bytes of an ECC code word, controller 108 may compensate for the wire failures by utilizing the erasure mode and identification of the respective error pattern.

Each memory rank 101 includes a plurality of DRAM components 102 within respective DIMMs 110 (see discussion of FIG. 1). Controller 108 may also compensate for failures of ones of DRAM components 102 as previously discussed.

Registers 109 may identify whether the erasure mode should be applied to data retrieved from a specific bank (subunit within a logical rank 101), logical rank 101 (pair of DIMMs 110 accessed in parallel), DRAM bus 505, quadrant bus 503, and/or any other suitable hardware component depending upon the architectural implementation. The capability to specify multiple independent erasures increases the probability that multiple repeatable failures in the memory system can be corrected. For example, two erasures may be specified, allowing two different repeatable errors associated with two different ranks or two different DRAM buses, etc. to be corrected.

Also, in erasure mode, a small percentage of uncorrectable errors may be decoded as correctable. The capability to specify the erasure for a limited region of the memory system reduces the probability of uncorrectable errors being misdiagnosed as correctable. For example, if a hardware error causes the corruption of a single-byte error for ECC code words communication via DRAM bus 505-1, one of registers 109 may be set to identify the specific byte of location of the ECC code word for that bus. When ECC code words are received from DRAM bus 505-1, the erasure mode may be applied to those ECC code words to address the data corruption. Moreover, the application of the erasure mode to those ECC code words may be independent of the processing of ECC code words retrieved from DRAM buses 505-2 through 505-8. Accordingly, the increased probability of misdiagnosed uncorrectable errors is limited to a specific subset of the memory system.

In the case where multiple erasures are identified, the portions of memory system 500 corresponding to each erasure should not overlap. That is, it is not advantageous to specify an erasure location associated with a specific rank and a different erasure location associated with the DRAM bus 505 containing that rank.

FIG. 6 depicts a flowchart for retrieving data stored in a memory system according to representative embodiments. In step 601, the logical rank in which cache line data is stored is determined. In step 602, the cache line is retrieved as a set of four consecutive ECC code words that enter the memory controller in eight consecutive cycles of data. Each ECC code word consists of two consecutive cycles with the even nibbles in the first cycle and the odd nibbles in the second cycle. In step 603, it is determined whether the erasure mode is enabled for the retrieved data via the value of the appropriate register(s). If the determination is true, the process flow proceeds to step 604. In step 604, for each respective pair of cache line data portions, the erasure byte due to the physical malfunction is corrected, one other byte error (if present) may be corrected, and multi-byte errors (if present) may be detected. If the logical determination of step 603 is false, the process flow proceeds to step 605. In step 605, for each respective pair of cache line data portions, a single byte error (if present) may be corrected and multi-byte errors (if present) may be detected. From both of steps 604 and 605, the process flow proceeds to step 606. In step 606, a logical comparison is made to determine whether an uncorrectable error (i.e., multi-byte errors) has been detected. If false, the process flow proceeds to step 607 where the cache line data is reassembled and the cache line is communicated to an appropriate processor. If the logical determination of step 606 is true, the process flow proceeds to step 608 where the occurrence of an uncorrectable error may be communicated using a suitable error signal.

Moreover, representative embodiments may also optimize the ECC algorithms for implementation in hardware according to the architecture of system 100. Specifically, commonly implemented ECC algorithms assume that all of the payload data is immediately available when the ECC bits are calculated. However, as previously discussed, representative embodiments retrieve the even nibbles of a code word in a first bus cycle and retrieve the odd nibbles of the code word in another bus cycle (see discussion of FIG. 6). Thus, in representative embodiments, there is some delay until all of the code word bits become available. Representative embodiments may advantageously begin processing the first group of nibbles immediately without waiting for the second group of nibbles.

FIG. 7 depicts a flowchart for processing retrieved data according to representative embodiment. In step 701, the even nibbles of a code word are retrieved. In step 702, the redundancy is partially computed by applying combinations of the retrieved bits to XOR trees. In step 703, the odd nibbles are retrieved. Step 703 may occur concurrently with the performance of step 702. When the odd nibbles are retrieved, the odd nibbles may be applied to XOR trees (step 704). In step 705, the results of the application of the even nibbles and the odd nibbles to XOR trees are combined by an XOR operation to form the full redundancy. While the recomputed redundancy is generated in this fashion, the retrieved redundancy may be assembled from its even and odd nibbles in the first and second cycles respectively. The recomputed redundancy and the retrieved redundancy are combined by an XOR operation to generate the syndrome (step 706). The syndrome is then decoded in one of two modes (step 707). If erasure mode has not been specified for the ECC code word, the syndrome is decoded to determine the location and value of a single-byte error. If erasure mode has been specified, a different decoding process is used to determine the value of the error in the erasure location and the location and value of an additional single-byte error, if one exists.

As previously discussed, buffer chips 104 may modify directory tag data and associated ECC data without requiring communication of cache line data as will be discussed in greater detail below. FIG. 8 depicts a flowchart associated with modification to tag data according to representative embodiments. In step 801, a memory request is received that modifies tag data according to a cache coherency scheme and that does not modify cache line data. In step 802, buffer 104 retrieves old tag data and old ECC data associated with the old tag data for the respective cache line. In step 803, the old tag data and the old ECC data are applied to XOR trees to generate intermediate result ECC data. In step 804, the new tag data is communicated to buffer 104. In step 805, the intermediate result ECC data and the new tag data are applied to XOR trees according to the ECC scheme to generate new ECC data. In step 806, the new ECC data is written to memory components such that each single-byte of data is stored in an appropriate DRAM component. In step 807, the tag data is written to memory such that each single-byte of data is stored in an appropriate DRAM component.

FIGS. 9-12 depict logical representations of XOR-tree operations that may be performed by buffer 104 for calculating new ECC data utilizing new tag data, old tag data, and old ECC data according to representative embodiments for the [36, 33, 4] shortened narrow-sense Reed-Solomon code discussed above. The operations of XOR-trees 900 and 1000 of FIGS. 9 and 10 operate by "removing" the contribution of the original or old tag data from the ECC data by XOR-ing the old tag data from the old ECC data to generate the intermediate ECC data. The new tag data is then contributed to the ECC data in XOR-trees 1100 and 1200 of FIGS. 11 and 12 by XOR-ing the new tag data with the intermediate ECC data.

In XOR-tree 900, each old_data[ ] term represents the respective retrieved bit of the 24-bits of tag data in portion 301 of the cache line layout 300 of FIG. 3. Likewise, each old_ecc[ ] term represents the respective retrieved bit of the 12-bits of ECC data in portion 301 of the cache line layout 300 of FIG. 3. Each old_data_ecc_XOR_c1[p] term represents the respective intermediate ECC result generated by XORing the respective old_data[ ] and old_ecc[ ] bits as shown. In XOR-tree 1000, each old_data_XOR_c2[ ] term represents the intermediate ECC result generated by XORing the respective old_data[ ] bits as shown.

FIG. 11 depicts XOR-tree 1100 that calculates new ECC data to be written to memory. Each new_data[ ] term represents the respective bit of the 24-bits of new tag data to be written to memory. Each new_ecc_c1[ ] term represents the respective bit to be written to the 12-bits of ECC data in portion 301 of cache line layout 300 of FIG. 3. Specifically, each new_ecc_c1[ ] term is generated by XORing the old_data_ecc_XOR_c1[ ] bits and the new_data[ ] bits as shown. Similarly, FIG. 12 depicts XOR-tree 1200 that calculates the new ECC data to be written to memory. Each old_ecc_c2[ ] term represents the respective bit retrieved from the 12-bits of ECC data in portion 302 of cache line layout 300 of FIG. 3. Each new_ecc_c2[ ] term represents the respective bit to be written to the 12-bits of ECC data in portion 302 of the cache line layout 300 of FIG. 3. Specifically, each new_ecc_c2[ ] term is generated by XORing the old_data_ecc_XOR_c2[ ] bits, old_ecc_c2[ ] bits, and the new_data[ ] bits as shown.

Other embodiments may process tag data and generate new ECC data utilizing ECC schemes other than the [36, 33, 4] shortened narrow-sense Reed-Solomon scheme. For example, other embodiments may implement controller 108 to apply an ECC scheme that detects and corrects two-bit adjacent errors. The ECC scheme may advantageously utilize ECC code words that possess a width of 144 bits to optimize bus utilization. The ECC code words may contain 12 bits of ECC data. FIGS. 13 and 14 depict XOR-trees 1300 and 1400 that are associated with updating tag data with the associated ECC data without requiring communication or processing of the cache line data. In XOR-tree 1300, old_data[28] through old_data[37] represent the old ECC data bits and old_data[0] through old_data[25] represent the old tag data of an ECC code word. The ECC code word being processing may belong to a group of code words for a cache line. The tag data in the ECC code word being processed may represent the cache coherency state for the cache line. In XOR-tree 1300, the contribution of the old tag data bits to the ECC code word are removed by the XOR-operations to generate intermediate XOR-result data (old_data_XOR[28] through old_data_XOR[37]). In XOR-tree 1400, the new ECC data (new_ECC[28] through new_ECC[37]) is calculated by applying the XOR-operations to the intermediate XOR-result data and the new tag data (new_data[0] through new_data[25]).

Representative embodiments may provide a number of advantageous characteristics. For example, by utilizing an ECC algorithm that corresponds to the physical implementation of system 100, the bus width may be maintained at a reasonable width. By maintaining the width of the bus in this manner, the bus utilization is increased thereby optimizing system performance. Also, tag data may be modified in an efficient manner without requiring communication or processing of cache line data. Moreover, by selectively applying an erasure mode for the ECC algorithm, the number of correctable errors due to hardware failures is increased and the probability of an uncorrectable multi-byte error being misdiagnosed is reduced. Furthermore, by ensuring each single-byte of an ECC code word is stored within a single DRAM component, representative embodiments enable an entire DRAM component to fail without causing the failure of the entire memory system. Likewise, wire failures in various buses that affect two or less single-bytes of ECC code words may be addressed to prevent failure of the memory system.

What is claimed is:

1. A system for processing memory transaction requests, comprising:

a controller for storing and retrieving cache lines to and from a plurality of memory components through at least one bus; and a buffer communicatively coupled to said controller and said at least one bus;

wherein said controller formats cache lines into a plurality of portions, implements an error correction code (ECC) scheme to correct a single-byte error in an ECC code word for pairs of said plurality of portions, stores respective pairs of plurality of portions such that each single-byte of at least one of said respective pairs of said plurality of portions is stored in a different one of said plurality of memory components; and wherein when said controller processes a memory transaction request that modifies tag data without modifying cache line data, (i) said controller communicates new tag data to said buffer and (ii) said buffer calculates new ECC data utilizing previous ECC data, previous tag data, and said new tag data without requiring communication of cache line data.

2. The system of claim 1 wherein said at least one bus has a bus width and said ECC code word has a code word length that is greater than said bus width.

3. The system of claim 2 wherein said code word length is twice as long as said bus width.

4. The system of claim 3 wherein said bus width is 144 bits and said code word length is 288 bits.

5. The system of claim 1 wherein each of said memory components has a bit-width of four bits.

6. The system of claim 1 wherein said plurality of memory components are within a plurality of dual in-line memory modules (DIMMs) that form a logical rank that has a bit-width equal to one-half of a length of said ECC code word.

7. The system of claim 6 wherein said controller stores pairs of said plurality of portions across said logical rank.

8. The system of claim 1 wherein said controller is further operable to correct an erasure byte in a second mode of ECC operation.

9. The system of claim 1 wherein said memory components are DRAM memory components.

10. A system for processing memory transaction requests, comprising:
   controller means for storing and retrieving cache lines to and from a plurality of memory components through at least one bus; and
   buffer means for buffering data from said plurality of memory components that is communicatively coupled to said controller and said at least one bus;
   wherein said controller means formats cache lines into a plurality of portions, implements an error correction code (ECC) scheme to correct a single-byte error in an ECC code word for pairs of said plurality of portions, stores respective pairs of plurality of portions such that each single-byte of said respective pairs of said plurality of portions is stored in a single one of said plurality of memory components;
   wherein when said controller means processes a memory transaction request that modifies tag data without modifying cache line data, (i) said controller means communicates new tag data to said buffer and (ii) said buffer means calculates new ECC data utilizing previous ECC data, previous tag data, and said new tag data without requiring communication of cache line data.

11. The system of claim 10 wherein said at least one bus has a bus width and said ECC code word has a code word length that is greater than said bus width.

12. The system of claim 11 wherein said code word length is twice as long as said bus width.

13. The system of claim 12 wherein said bus width is 144 bits and said code word length is 288 bits.

14. The system of claim 10 wherein each of said memory components has a bit-width of four bits.

15. The system of claim 10 wherein said plurality of memory components are within a plurality of dual in-line memory modules (DIMMs) that form a logical rank that has a bit-width equal to one-half of a length of said ECC code word.

16. The system of claim 15 wherein said controller means stores pairs of said plurality of portions across said logical rank.

17. The system of claim 10 wherein said controller means is further operable to correct an erasure byte in a second mode of ECC operation.

18. The system of claim 10 wherein said memory components are DRAM memory components.

19. A method for operating a memory system, comprising:
   processing cache line data and tag data by a controller to be stored in a plurality of data portions, wherein each pair of said plurality of data portions form an error correction code (ECC) code word that enables correction of a single-byte error in said ECC code word;
   storing each pair of said plurality of data portions across a plurality of memory components such that each single-byte of each pair is stored in a single one of said plurality of memory components;
   a receiving memory request transaction that modify tag data associated with said plurality of data portions and that does not modify cache line data; and
   calculating, in response to said receiving, new ECC data utilizing previous ECC data, previous tag data, and new tag data without requiring communication of cache line data.

20. The method of claim 19 wherein said calculating is performed by a buffer between said controller and said plurality of memory components.

* * * * *

UNITED STATES PATENT AND TRADEMARK OFFICE
CERTIFICATE OF CORRECTION

| | |
|---|---|
| PATENT NO. | : 7,392,347 B2 |
| APPLICATION NO. | : 10/435140 |
| DATED | : June 24, 2008 |
| INVENTOR(S) | : Theodore C. Briggs |

It is certified that error appears in the above-identified patent and that said Letters Patent is hereby corrected as shown below:

In column 5, line 47, delete "10b" and insert -- 110b --, therefor.

Signed and Sealed this

Fourth Day of May, 2010

David J. Kappos
*Director of the United States Patent and Trademark Office*